United States Patent
Valdevit et al.

(10) Patent No.: US 7,383,353 B2
(45) Date of Patent: Jun. 3, 2008

(54) LOAD BALANCING IN A NETWORK COMPRISING COMMUNICATION PATHS HAVING DIFFERENT BANDWIDTHS

(75) Inventors: Ezio Valdevit, Redwood City, CA (US); Vineet Abraham, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 1038 days.

(21) Appl. No.: 10/208,969

(22) Filed: Jul. 31, 2002

(65) Prior Publication Data

US 2004/0024906 A1 Feb. 5, 2004

(51) Int. Cl.
*G06F 15/173* (2006.01)
(52) U.S. Cl. ............... 709/241; 709/238; 709/240; 709/242
(58) Field of Classification Search ............. 709/241, 709/238, 240
See application file for complete search history.

(56) References Cited

U.S. PATENT DOCUMENTS

| | | | |
|---|---|---|---|
| 6,262,974 B1* | 7/2001 | Chevalier et al. | 370/232 |
| 6,363,077 B1* | 3/2002 | Wong et al. | 370/422 |
| 6,690,671 B1* | 2/2004 | Anbiah et al. | 370/395.43 |
| 2002/0075540 A1* | 6/2002 | Munter | 359/128 |
| 2004/0024906 A1* | 2/2004 | Valdevit et al. | 709/241 |

* cited by examiner

*Primary Examiner*—John Follansbee
*Assistant Examiner*—Nghi V Tran
(74) *Attorney, Agent, or Firm*—Conley Rose, P.C.

(57) ABSTRACT

A network comprises a plurality of interconnected switches. At least one pair of switches is interconnected by a trunk formed from a plurality of individual links. A cost value is assigned to the trunk that is equal to the cost of one of the trunk's individual links. As such, a trunk is considered the same as an individual link when shortest path calculations are made. When multiple paths are computed as having the same lowest cost, the system balances load traffic between such lowest cost paths in a way that takes advantage of the higher bandwidth capabilities of trunks.

15 Claims, 2 Drawing Sheets

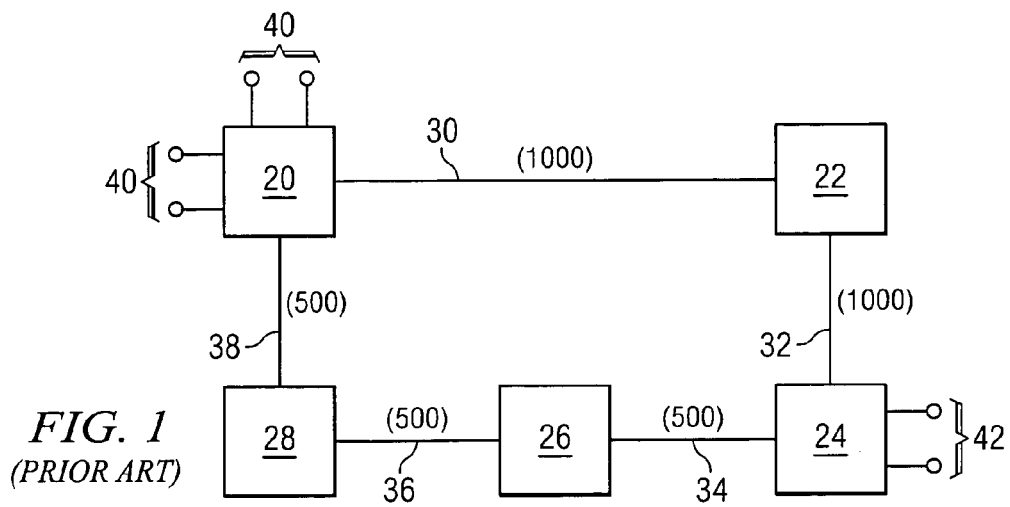
FIG. 1 (PRIOR ART)
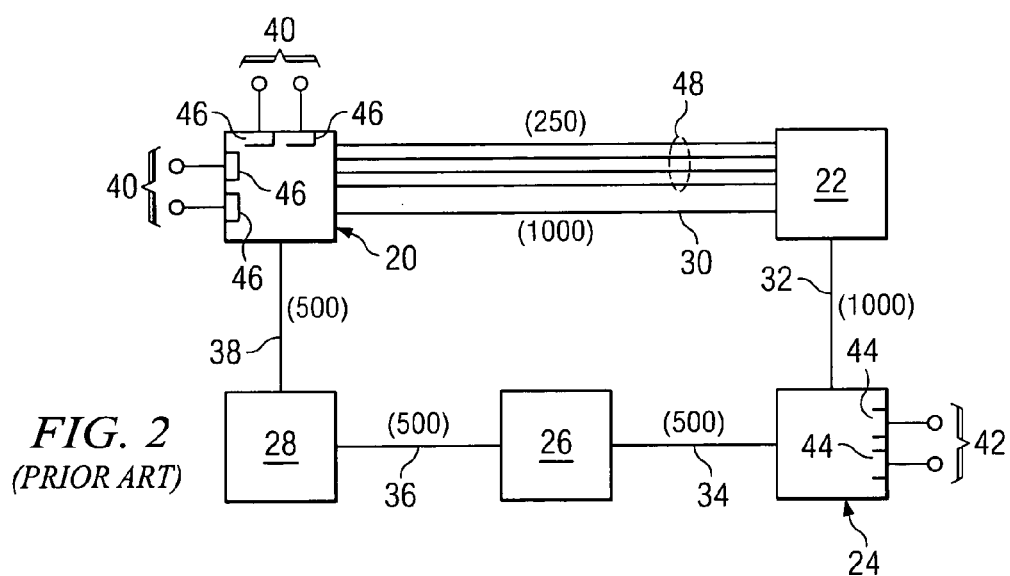
FIG. 2 (PRIOR ART)
| P7(4GBPS) | P8(2GBPS) | P9(2GBPS) | P10(4GBPS) | |
|---|---|---|---|---|
| (0%) | (0%) | (0%) | (0%) | ← 70 |
| P1(50) | | | | ← 71 |
| | | | P2(25) | ← 72 |
| | | | P3(75) | ← 73 |
| | P4(50) | | | ← 74 |
| P5(100) | | | | ← 75 |
| | | P6(100) | | ← 76 |
FIG. 4

LOAD BALANCING IN A NETWORK COMPRISING COMMUNICATION PATHS HAVING DIFFERENT BANDWIDTHS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to computer networks. More particularly, the invention relates to electronic switches through which communications pass from one point in a network to another. Still more particularly, the invention relates to load balancing in a switch-based fabric.

2. Background Information

Initially, computers were most typically used in a standalone manner. It is now commonplace for computers and other types of computer-related and electronic devices to communicate with each other over a network. The ability for computers to communicate with one another has lead to the creation of networks ranging from small networks comprising two or three computers to vast networks comprising hundreds or even thousands of computers. Networks can be set up to provide a wide assortment of capabilities. For example, networks of computers may permit each computer to share a centralized mass storage device or printer. Further, networks enable electronic mail and numerous other types of services. Generally, a network's infrastructure comprises switches, routers, hubs and the like to coordinate the effective and efficient transfer of data and commands from one point on the network to another.

Networks often comprise a "fabric" of interconnected switches which are devices that route data packets from a source port to a destination port. FIG. 1 exemplifies a switch fabric having five switches 20, 22, 24, 26, and 28. The switches 20-28 are interconnected by links 30-38, as shown. One or more devices can be connected to any of the switches. In FIG. 1, four devices 40 are connected to switch 20 and two devices 42 connect to switch 24. The devices may be any desirable types of devices such as servers and storage devices.

A device 40 connected to switch 20 may need to send a data packet to a device 42 connected to switch 24. The packet can be routed from switch 20 to switch 24 via one of two paths in the exemplary architecture of FIG. 1. One path comprises switches 20-22-24 and the other path comprises switches 20-28-26-24. In many networks, the path that will be used between pairs of switches is determined a priori during system initialization or when the fabric configuration changes such as the addition or removal of a switch. Various path selection algorithms have been suggested and used. One such conventional path selection algorithm is often referred to as the "shortest path" algorithm. According to this algorithm, the shortest path is selected to be the path for routing packets between switches. The shortest path takes into account the bandwidth of the various links interconnecting the switches.

Referring still to FIG. 1, a "cost" value is assigned to each link. The numbers shown in parentheses adjacent each link represents the cost of each link. The cost values are generally arbitrary in magnitude, but correlate with a system criteria such as the inverse of the bandwidth of the links. That is, higher bandwidth links have lower costs. For example, links 30 and 32 may have the same bandwidth (e.g., 1 gigabits per second ("gbps")) and may be assigned a cost value of 1000. Links 34, 36, and 38 may have twice the bandwidth of links 30 and 32 (2 gbps) and accordingly may be assigned cost values of 500 (one-half of the cost of links 30 and 32). The shortest path represents the path with the lowest total cost. The total cost of the path is the sum of the costs associated with the links comprising the path. In the example of FIG. 1, the 20-22-24 path has a total cost of 2000, while the total cost of the 20-28-26-24 path is 1500. As the lowest cost path, the 20-28-26-24 path will be selected to be the path used for routing data packets between devices 40 and 42. It should be understood that the cost values may be related to other system criteria besides bandwidth. Examples include the delay in crossing a link and a monetary cost an entity might charge for the ISL.

A complication to the lowest cost path selection algorithm is introduced when "trunks" are implemented in a switching fabric. For additional information regarding trunking, please refer to U.S. Pat. No. 09/872,412, filed Jun. 1, 2001, entitled "Link Trunking and Measuring Link Latency in Fibre Channel Fabric," by David C. Banks, Kreg A. Martin, Shunjia Yu, Jieming Zhu and Kevan K. Kwong, incorporated herein by reference. For example, FIG. 2 repeats the fabric architecture of FIG. 1, but also includes a trunk 48 interconnecting switches 20 and 22. In general, a trunk comprises a logical collection of two or more links. In FIG. 2, trunk 48 comprises four links. Although the trunk is actually four separate parallel links, the trunk appears as one logical "pipe" for data to flow between switches. Hardware (not specifically shown) in switches 20 and 22 selects one of the various links comprising the pipe when sending a data packet across the trunk, thereby alleviating the higher level logic in the switch from controlling the operation of the trunk.

Because the links comprising the trunk can be used simultaneously to send data packets, the trunk effectively has a bandwidth that is greater than the bandwidth of the links comprising the trunk. In FIG. 2, if the bandwidth of each link comprising trunk 48 is the same as the bandwidth of separate link 30 (i.e., 1 gbps), the effective bandwidth of trunk 48 with four 1 gbps links is 4 gbps. In the context of each path having a cost associated with it, the system might assign trunk 48 a cost of one-fourth the cost of link 30, which would be a cost of 250. Then, the lowest cost path from devices 40 to devices 42 would be the 1250 cost path comprising switches 20-22-24 and including trunk 48 between switches 20 and 22.

In some situations, this will be a satisfactory implementation. However, this implementation may be less than satisfactory in other situations. Because traffic from devices 40 will be routed from switch 20 to switch 22 through trunk 48 to the exclusion of link 30, trunk 48 will carry all of the traffic and parallel link 30 will carry no traffic and thus be underutilized. This is acceptable if the bandwidth of the data does not exceed the capacity of trunk 48. If the data does exceed the bandwidth of the trunk, then performance is reduced despite link 30 being available to carry traffic, but not being used in that regard.

Referring still to FIG. 2, devices 40 and 42 connect to ports 46 and 44, respectively, contained in their associated switches 20 and 24. The speed of the links connecting devices 40, 42 to their ports 46, 44 may vary from device to device. Some devices, for example, may connect via a 1 gbps link, while other devices connect via 2 gbps links. The conventional shortest path selection algorithm typically does not take into account the speed of the peripheral links connecting the peripheral devices to the switches when assigning the source ports (e.g., ports 46) to the paths determined to be shortest, thereby possibly resulting in less than optimal path assignments.

Accordingly, a solution to these problems is needed. Such a solution preferably would efficiently merge together tank implementations in the face of a network fabric based on a shortest path selection algorithm and take into account peripheral link speeds.

BRIEF SUMMARY OF THE PREFERRED EMBODIMENTS OF THE INVENTION

The preferred embodiments of the present invention solve the problems noted above by a network comprising a plurality of interconnected switches. At least one pair of switches is interconnected by a trunk formed from a plurality of individual links. Rather than assigning a cost value to the trunk commensurate with its higher bandwidth (relative to an individual link), a cost value is assigned to the trunk that is equal to the cost of one of the trunk's individual links. Thus, in general, each trunk has a cost value for purposes of path calculation that is the same as the cost of individual (i.e., non-trunked) links in the network. As such, a trunk is considered the same as an individual link when the shortest path calculations are made. In further accordance with the preferred embodiment, when multiple paths are computed as having the lowest cost, the system balances load traffic between such lowest cost paths in a way that favors trunks without totally excluding non-trunk links.

More specifically, each switch comprises a plurality of source ports and destination ports and each destination port is connected to a communication link. Two or more source or destination ports may be logically combined together to form a trunk. A CPU in each switch balances its source ports among the destination ports that are part of the lowest cost paths. This load balancing technique is based on bandwidth allocation of the destination ports. The bandwidth allocation is determined to be the percentage of the bandwidth of the destination port that would be used if the source ports currently assigned to the destination port were providing traffic at their full rated bandwidth. Thus, by assigning the same cost value to a trunk as an individual link, trunks are not used to the total exclusion of other slower links as noted above. However, the preferred load balancing technique described herein still takes into account the higher bandwidth capabilities of trunks when balancing the source ports across the various destination ports.

These and other aspects and benefits of the preferred embodiments of the present invention will become apparent upon analyzing the drawings, detailed description and claims, which follow.

BRIEF DESCRIPTION OF THE DRAWINGS

For a detailed description of the preferred embodiments of the invention, reference will now be made to the accompanying drawings in which:

FIG. 1 shows a conventional switch fabric in which a shortest path selection algorithm is implemented;

FIG. 2 shows a similar fabric that also includes a trunk comprising more than one link;

FIG. 4 depicts an exemplary logical sequence that is followed to assign source ports to destination ports in a switch in accordance with the preferred embodiment of the invention.

NOTATION AND NOMENCLATURE

Figure 3:
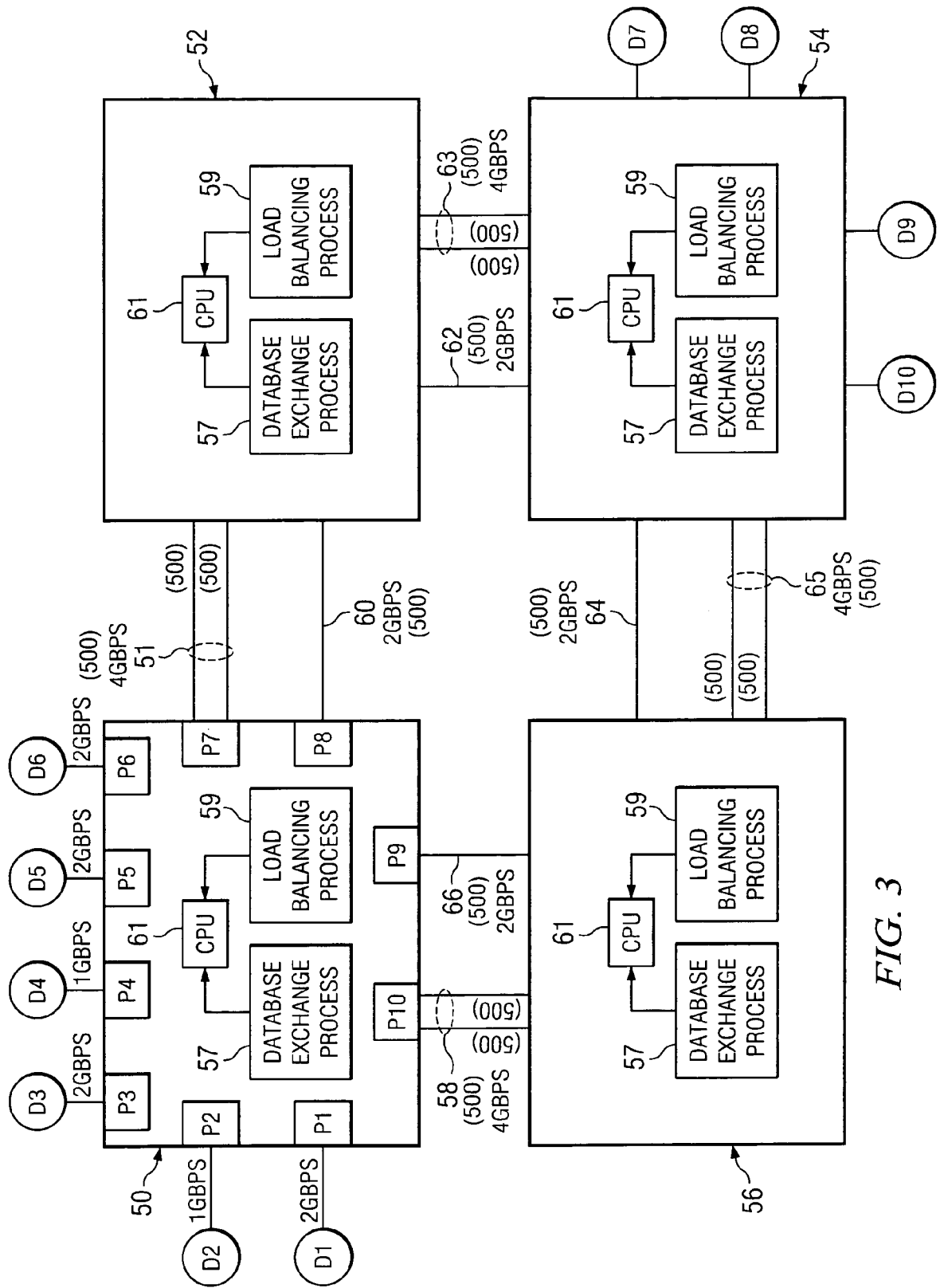
FIG. 3 shows a preferred embodiment of the invention in which each trunk is assigned a cost value equal to the cost of an individual link forming the trunk.

Certain terms are used throughout the following description and claims to refer to particular system components. As one skilled in the art will appreciate, computer and computer-related companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to. . . ". Also, the term "couple" or "couples" is intended to mean either a direct or indirect physical connection. Thus, if a first device couples to a second device, that connection may be through a direct physical connection, or through an indirect physical connection via other devices and connections.

To the extent that any term is not specially defined in this specification, the intent is that the term is to be given its plain and ordinary meaning.

DETAILED DESCRIPTION OF THE PREFERRED EMBODIMENTS

In accordance with the preferred embodiment of the invention, an improved load balancing technique is implemented in a network comprising trunks formed from individual communication links. Although cost values are generally inversely proportional to link bandwidth, higher bandwidth trunks preferably are not assigned lower cost values. Instead, the trunks are assigned a cost value that is the cost of the individual links comprising the trunk. Because trunks do not have lower cost values, trunks advantageously are not assigned source ports to the total exclusion of other ports as noted above with regard to conventional techniques. Further, source ports are distributed across the various lowest cost paths in a way that favors the higher bandwidth trunks, but not necessarily to the exclusion of other links. Although numerous embodiments of the invention are possible, the following discussion provides one such suitable embodiment.

Referring now to FIG. 3, a switch fabric is shown comprising four switches 50, 52, 54 and 56 permitting devices D1-D10 to communicate with each other. Devices D1-D6 couple to switch 50, while devices D7-D10 couple to switch 54. As noted previously, devices D1-D10 can be any desired devices including servers, storage devices, etc. Switch 50 couples to switch 52 via a trunk 51 and an individual link 60. Similarly, switch 50 couples to switch 56 via a trunk 58 and link 66. Switches 52 and 56 couple to switch 54 via links 62 and 64, and trunks 63 and 65 as shown. All of the links shown in FIG. 3 including the links comprising trunks 51, 58, 63 and 65 as well as links 60, 62, 64 and 66 preferably have the same bandwidth, which as shown in the exemplary embodiment of FIG. 3, is 2 gbps. Because two 2 gbps links are combined together to form trunks 51, 58, 63, 65 such trunks are capable of 4 gpbs of traffic. Switch 50 is shown as having a number of ports P1-P10 and may have additional ports (e.g., 16 total ports) as desired. As shown, devices D1-D6 are assigned to ports P1-P6. Ports P7 and P10 are assigned to trunks 51 and 58, respectively, while ports P8 and P9 are assigned to links 60 and 66. Ports P1-P6 are referred to herein as "source" ports and ports P7-P10 are referred to as "destination" ports, although in general, each port is bi-directional. It should also be understood that each link in a trunk is connected to a separate destination port and that such destination ports are aggregated together to form the logical trunk. Thus, ports P7 and P10 are actually two separate ports aggregated together. The values next to the links connecting devices D1-D6 to ports P1-P6 represent the bandwidth in units of gigabits (gbps).

In accordance with the preferred embodiment of the invention, for load balancing purposes trunks 51 and 58, as well as trunks 63 and 65, are considered to have the same cost as the individual links comprising the trunks. In the example of FIG. 3 all of the individual links have a cost of 500 which is indicated in parentheses adjacent each link. Rather than reducing the cost of the higher bandwidth trunks in proportion to the increase in the trunks' effective bandwidth, the cost of the trunks are considered to be the same as the individual links comprising the trunks (i.e., 500). That is, the various paths from switch 50 to switch 54 all have the same cost. Those paths include switch 50-trunk 51-switch 52-link 62 (or trunk 63)-switch 54; (2) switch 50-link 60-switch 52-link 62 (or trunk 63)-switch 54; (3) switch 50-trunk 58-switch 56-link 64 (or trunk 65)-switch 54; and (4) switch 50-link 66-switch 56-link 64 (or trunk 65)-switch 54. By assigning each trunk 51 and 58 the same weight as an individual link, the path selection criterion of the preferred embodiment avoids using a trunk to the exclusion of a sister link as explained previously. In the exemplary embodiment of FIG. 3, there are eight possible paths all having the same cost. Thus, there are eight lowest cost paths between switches 50 and 54. As such, the system will balance the traffic load among these eight paths, and do so in a way that favors the higher bandwidth trunks even though the trunks were assigned the same cost as the other links. This load balancing process is described below.

Referring still to FIG. 3, each switch 50-56 includes two processes 57 and 59. These processes are implemented as firmware stored in memory coupled to a CPU 61 and executed by the CPU. Process 57 comprises a switch interconnect database exchange process. This process propagates connection information to all adjacent switches in accordance with any suitable, known technique. For example, switch 50 propagates its connection information to switches 52 and 56, while switch 52 propagates its connection information to switches 50 and 54. The connection information for a switch comprises a database having a plurality of entries. Each entry includes, for each of the switch's ports, the identity of the adjacent switch connected to that port, the identity of the adjacent switch's port, and the cost of the link formed therebetween. Other information may be included as desired. In accordance with known techniques, the switch interconnect database exchange process 57 propagates this database to adjacent switches which, in turn, continue the propagation of the information. Eventually, all switches in the fabric have a complete and identical interconnection database.

Process 59 comprises a load balancing process which uses the interconnection database information and computes the cost of the various paths through the network, determines the lowest cost paths, and balances the loads across multiple lowest cost paths as described below. The following explanation illustrates the preferred embodiment in balancing load between devices D1-D6 and devices D7, D8 and, more specifically, balancing loads between switch 50's source ports P1-P6 and the switch's destination ports P7-P10. Reference should be made to FIGS. 3 and 4 for the following discussion.

FIG. 4 lists the four destination ports P7-P10 for switch 50 along with their associated bandwidths in parentheses. Steps 70-76 depict the sequential assignment of source ports P1-P6 to destination ports P7-P10 in accordance with a preferred embodiment of the invention. Initially, before any assignments are made, none of the bandwidth of the links and trunks assigned to the destination ports (i.e., trunks 51, 58 and links 60, 66) are allocated. This fact is reflected at 70 in which 0% of the bandwidth associated with each of the destination ports is allocated. Ports P7 and P10 which connect to trunks 51 and 58 have 4 gbps of bandwidth, while ports P8 and P9 which connect to links 60 and 66 have 2 gbps of bandwidth.

The source ports P1-P6 can be assigned in any desired order to the destination ports. As discussed below, the source ports are assigned in numerical order in FIG. 4 starting with port P1 and progressing through port P6. In accordance with the preferred embodiment of the invention, source port assignments preferably are made in a manner that keeps the bandwidth allocation of the ports as low as possible and in a way that evenly distributes the loads or source ports across the various destination ports.

Referring to FIGS. 3 and 4, port P1 is connected to device D1 over a 2 gpbs link. If the 2 gbps source port P1 was assigned to either of the 2 gbps destination ports P8 or P9, the destination port's bandwidth allocation would increase to 100%, assuming that, in fact, the full 2 gbps bandwidth of the source port was being used. This assumption, that the full rated bandwidth of a port is being used, is made throughout the path assignment technique described herein. In an attempt to keep the bandwidth allocation numbers as low as possible, as noted above, the 2 gpbs source port P1 preferably is assigned to one of the 4 gbps destination ports P7 or P10. Assigned to a 2 gbps source port, the 4 gbps destination port's bandwidth allocation will become 50%, which of course is lower than the 100% allocation that would have resulted if the ports P8 or P9 were used. Because there are two 4 gbps destination ports P7 and P10 available for the assignment of source port P1, either destination port can be used. In accordance with the preferred embodiment of the invention, the assignment is made to the lowest numbered port (i.e., port P7). Step 71 reflects this assignment with source port P1 listed in the column beneath destination port P7. The value 50% in parentheses next to source port P1 in step 71 shows that the bandwidth allocation for destination port P7 has risen to 50%.

A similar logic is applied to the assignment of the remaining source ports P2-P6. Source port P2 couples via a 1 gbps link to device D2. Again, examining the various destination ports P7-P10, the 1 gpbs source port P2 represents a 25% bandwidth allocation with regard to the 4 gbps destination ports P7 and P10 and a 50% allocation with regard to the 2 gbps destination ports P8 and P9. Because destination port P7 already has 50% of its bandwidth accounted for by virtue of source port P1, assigning source port P2 to destination port P7 would result in an allocation of 75% with regard to port P7. In an attempt to keep the bandwidth allocations low and evenly distributed across the various destination ports, source port P1 preferably is assigned to destination port P10. This assignment results in the allocation of ports P7-P10 being 50%, 0%, 0% and 25%, respectively, as shown by steps 70-72.

Considering now source port P3 which is a 2 gbps port, that port preferably also is assigned to the 4 gbps destination port P10 as shown in step 73. As such, the allocation of port P10 will be 75% which results from the 1 gbps port P2 (25%) and the 2 gbps port P3 (50%). Assignment of source port P3 to destination ports P7, P8 or P9 would result in an allocation of 100% for those ports.

Source port P4 is 1 gbps port. Assignment of port P4 to ports P7 or P10 would result in allocation of those destination ports of 75% and 100%, while assignment to either of the 2 gbps ports P8 or P9 will result in only a 50% allocation. Being the smaller port number, port P8 is selected to accommodate source port P4 as shown in step 74.

Source port P5 is a 2 gbps second port. Assignment of that port to destination ports P8-P10 would result in bandwidth allocations of 150% (an over-allocation condition), 100% and 125% (also an over-allocation condition), respectively. However, assignment to destination port P7 as shown at step 75 causes port P7 to be 100% allocated. Because the assignment of source port P5 to ports P7 or P9 would result in the same allocation, port P7 being the smaller port number is selected. If there is a tie between 2 destination ports (as would be the case above), the tie is broken by selecting the destination port that has the highest bandwidth. If there are multiple ports that have the same bandwidth, the tie is broken by selecting the destination port with the smaller port number. Finally, as depicted at step 76 source port P6 (which is a 2 gbps port) is assigned to destination port P9 resulting in a 100% allocation of port P9 because any other destination port assignment would result in allocations greater than 100%.

Referring still to FIG. 4, the six source ports P1-P6 have been assigned to the four destination ports as shown. As can be seen, two source ports have been assigned to each of the destination ports P7 and P10 that are coupled to the higher bandwidth trunks 51 and 58, while only one source port is assigned to each of the other lower bandwidth destination ports P8 and P9. As such, an efficient allocation of source ports to destination ports is achieved without any destination port being over-allocated (i.e., bandwidth allocation in excess of 100%). Further, the bandwidths of the source devices themselves have been taken into account when making the destination port assignments. In general, load balancing is based on (1) the bandwidth associated with the links connected to the destination ports forming part of the lowest cost paths, (2) the bandwidth of trunks formed from the destination ports (if a trunk is so formed), (3) the bandwidth allocation of the destination ports, and (4) the bandwidth associated with the source ports.

Should the allocation of each of the destination ports reach 100%, adding an additional source port will result in an over-allocation condition. This being the case, the additional source port is assigned using the above techniques to minimize the over-allocation. Thus, in the preceding example, the next source port would be assigned to destination port P7. This process continues until all of the source ports have been assigned.

It should be understood that the preferred embodiment of the invention is not limited to networks that have trunks. For example, with reference to FIG. 3, if the two trunks 51 and 58 were replaced with two 1 gpbs links, each of such 1 gbps links would ordinarily have a cost of 100 and thus would not be used to route traffic. In accordance with a preferred embodiment, however, a cost of 500 could be assigned to the 1 gbps links and the process described above would cause twice as many ports (P1-P6) to be assigned to the 2 gbps links 60 and 66.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of load balancing in a network comprising a plurality of switches coupled together by individual links and trunks comprising individual links, the method including:
 (a) assigning a cost value to each link in the network based on a system criteria;
 (b) assigning to each trunk a cost value that is equal to the cost value of one of the links in the trunk, wherein the links in the trunk have equal cost values;
 (c) computing the total cost of each path through the network between a pair of switches;
 (d) from a plurality of paths, determining multiple paths having a total cost that is lower than the total cost of all other paths; and
 (e) balancing traffic load among said multiple lowest cost paths;
wherein, if said multiple lowest cost paths comprises one path that includes a trunk and another path that does not include a trunk, includes assigning more traffic to the path that includes the trunk.

2. The method of claim 1 wherein (e) includes balancing traffic load based on bandwidth allocation of each of said lowest cost paths.

3. The method of claim 2 wherein (e) includes keeping the bandwidth allocation of each of said lowest cost paths less than 100%.

4. A load balancing method implemented in a network switch having a plurality of source ports and destination ports, comprising:
 (a) forming a trunk from a plurality of destination ports, said trunk having a cost equal to the cost of the destination ports forming the trunk;
 (b) determining the bandwidth allocation of the destination ports and the trunk included in lowest cost paths for said source ports;
 (c) balancing the source ports among the destination ports and trunks comprising the lowest cost paths for said source ports based on the relative bandwidth allocations of the destination ports and trunks; and
 (d) determining the lowest cost paths for a source port by retrieving cost values from a database contained in said switch and adding together said cost values for a plurality of paths usable by said source ports for network traffic.

5. The method of claim 4 wherein (c) includes assigning more source ports to said trunk than other destination ports.

6. The method of claim 4 wherein more traffic from said source ports is assigned to said trunk than other destination ports.

7. A network, comprising:
 a plurality of switches each including a CPU and coupled together via communication links forming paths, each link having a bandwidth;
 at least one pair of switches in said network interconnected by a trunk formed from a plurality of links, said trunk having a bandwidth that is greater than the bandwidth of the links forming the trunk;
 wherein each of said links in said network is assigned a cost value based on its bandwidth;

wherein the trunk is also assigned a cost value that is equal to the cost value associated with one of the links forming the trunk; and wherein the CPU in each switch computes the total cost of each path between a pair of switches, the total cost of a path being the sum of the costs of the path's links and trunk, if the trunk exists in the path; and wherein the CPU in each switch also identifies the lowest cost paths and balances traffic among said lowest cost paths and assigning more traffic to a path that contains a trunk relative to other paths that do not contain a trunk.

8. The network of claim 7 wherein the CPU in each switch determines a bandwidth allocation for each path and balances traffic based on the bandwidth allocations of said lowest cost paths.

9. The network of claim 8 wherein each switch comprises a plurality of source ports and destination ports, each port connected to a link or trunk, and said CPU assigns each source port to a destination port based on the bandwidth allocation of the link or trunk connected to said destination port.

10. A switch usable in a network comprising a plurality of switches coupled by communication links, the switch comprising:
a CPU;
memory coupled to said CPU, said memory containing firmware executable by said CPU;
a plurality of source ports;
a plurality of destination ports wherein each destination port is for connection to a communication link and at least two destination ports can be logically combined together to form a trunk;
wherein each communication link has a bandwidth and a cost based on said bandwidth and wherein a trunk has a cost equal to the cost associated with one of the links forming the trunk;
wherein the CPU computes a total cost of multiple paths in the network, the total cost of a path being a sum of costs of the path's links and trunk, if a trunk exists in the path;
wherein the CPU identifies the lowest cost paths and balances traffic among said lowest cost path; and
wherein said CPU assigns source ports to destination ports based on (1) the bandwidth associated with the links connected to the destination ports, (2) the bandwidth of the trunk and (3) bandwidth allocation of the destination ports.

11. The switch of claim 10 wherein the CPU assigns the largest number of source ports to the trunk.

12. The switch of claim 10 wherein the source port assignments made by the CPU causes more network traffic to be routed through the trunk.

13. The switch of claim 10 wherein CPU assigns source ports to destination ports also based on the bandwidth associated with the source ports.

14. A method of load balancing in a network comprising a plurality of switches coupled together by inter-switch links (ISLs) some ISLs having a higher bandwidth than other ISLs, the method including:
(a) between a pair of switches having a first and a second ISL interconnecting said pair, the first ISL having a higher bandwidth than the second ISL, assigning the same cost value to said first and second ISLs interconnecting said pair of switches;
(b) computing the total cost of various paths through the network;
(c) from a plurality of paths, determining multiple paths having a total cost that is lower than the total cost of other paths;
(d) balancing traffic load among said multiple lowest cost paths using the bandwidth; and wherein the first and second ISLs are part of a lowest cost path and (d) includes using the bandwidths of the first and second ISLs to balance traffic load.

15. A switch usable in a network comprising a plurality of switches coupled together by communication links, the switch comprising:
a CPU;
memory coupled to said CPU, said memory containing firmware executable by said CPU;
a plurality of source ports;
a plurality of destination ports wherein each destination port is for connection to a communication link and some destination ports have a higher bandwidth than other destination ports and all destination ports are assigned a cost;
wherein the same cost is assigned to at least two destination ports having different bandwidths;
wherein said CPU assigns source ports to destination ports based on (1) the bandwidth associated with the links connected to the destination ports and (2) the bandwidth allocation of the destination ports; and
wherein said CPU computes multiple lowest cost paths through the network between a pair of switches, and if said multiple lowest cost paths comprise one path that includes a destination port having a higher bandwidth and another path that includes a destination port not having the higher bandwidth, said CPU assigns more traffic to the path that includes the destination port having the higher bandwidth.

* * * * *